July 21, 1942.　　　O. F. RUSSELL　　　2,290,250
CONTROL MEANS FOR MOTOR DRIVEN SKATES
Filed Nov. 27, 1941　　　2 Sheets-Sheet 2
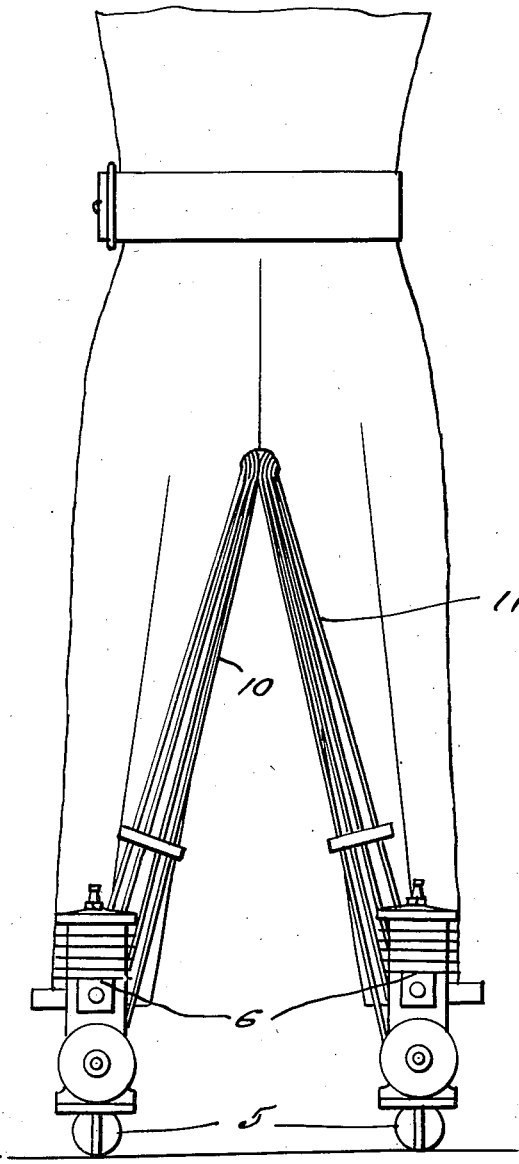
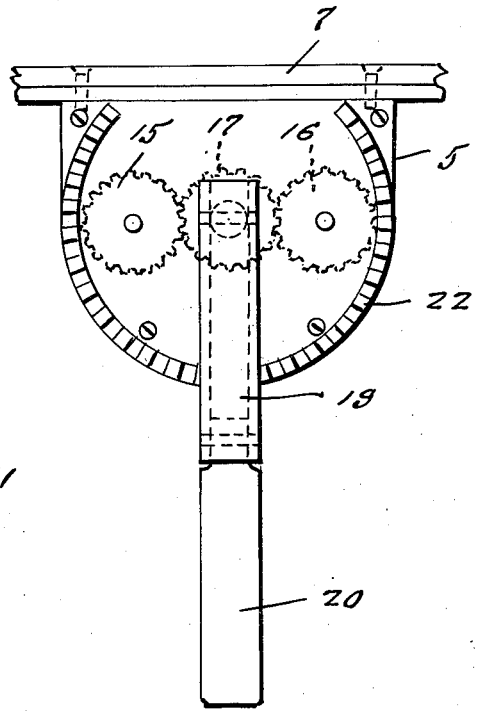
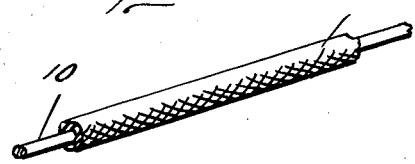
Inventor
Oren F. Russell
By Clarence A. O'Brien
Attorney.

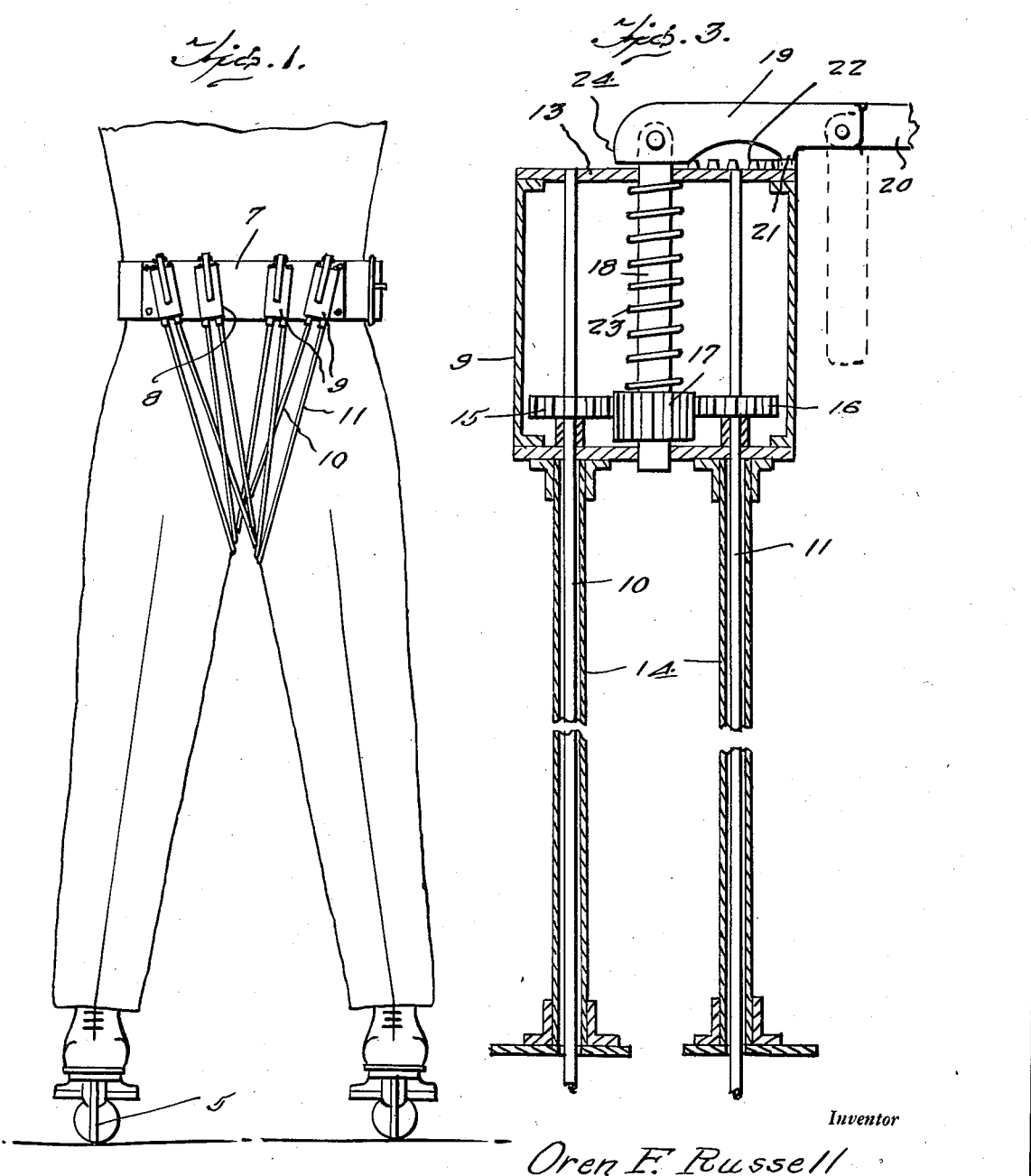

Patented July 21, 1942

2,290,250

UNITED STATES PATENT OFFICE 2,290,250

CONTROL MEANS FOR MOTOR DRIVEN SKATES

Oren F. Russell, Palmer, Wash.

Application November 27, 1941, Serial No. 420,741

4 Claims. (Cl. 180—77)

The present invention relates to new and useful improvements in motor driven ice skates and has for its primary object to provide control means for the motor in which said control means embodies levers attached to a belt secured to the waist of a person and including flexible cables leading from the lever to the several mechanisms of the motor, such as the switch, timer, clutch and gear shift, for controlling the operation of the motor.

An important object of the present invention is to provide control means for the motors mounted on each of the skates and to the several control parts of each motor are connected cables arranged in pairs for synchronous actuation from a common control lever.

A further object is to provide a motor control device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view of the supporting belt for the several control devices of the various parts of the motor.

Figure 2 is a rear elevational view showing the motors mounted on the skates and with the control cables leading therefrom.

Figure 3 is a vertical sectional view through one of the control units.

Figure 4 is a top plan view of one of the control units, and

Figure 5 is a fragmentary perspective view of one of the control cables.

Referring now to the drawings in detail, wherein for the purpose of illustration I have disclosed a preferred embodiment of the invention, the numeral 5 designates a motor driven ice skate of which one is adapted for attaching to each foot of a wearer and supported on the rear end of each skate is a motor 6, preferably in the form of an internal combustion engine.

Secured around the waist of the wearer is a belt 7 to which is attached a plurality of motor control units designated generally at 8. Each of the control units comprises a substantially cylindrical housing 9 having a pair of flexible cables 10 and 11 extending upwardly through the bottom of the housing and with the upper end of the cables journaled in the top 13 of the housing as shown to advantage in Figure 3 of the drawings.

The cables are enclosed in flexible housings 14, each of the cables of the respective units leading to similar control parts of the motors for simultaneously actuating such parts of each motor.

Secured to the cables 10 and 11 within the housing 9 are gears 15 and 16, each of the gears being engaged by a pinion 17 secured on a shaft 18 extending vertically in the housing with one end of the shaft journaled in the bottom of the housing and the upper end of the shaft extending outwardly through the top 13 thereof, and slidable therein.

To the upper end of the shaft 18 is pivoted a control lever 19 having a pivotal extension 20 at its outer end adapted to normally hang in a vertical position as shown by the dotted lines in Figure 3 of the drawings. To the underside of the lever 19 is formed a detent 21 adapted for engaging the spaced teeth 22 formed in a circular arrangement on the upper surface of the top 13 of the housing.

Positioned on the shaft 18 in the housing is a coil spring 23 having one end engaging the pinion 17 and its other end engaging the top 13, the spring normally urging the shaft 18 downwardly.

The inner end 24 of the lever is adapted to bear against the top 13 when the lever is raised upwardly for disengaging the detent 21 from the teeth whereby the shaft 18 will also be raised upwardly, but the pinion 17 is of sufficient width to always maintain the same in engagement with the gears 15 and 16. The spring 23 normally returns the shaft and lever downwardly into the position as shown in Figure 3.

From the foregoing it will be apparent that by raising the lever 19 upwardly to disengage the detent 21 from the teeth 22 the cables 10 and 11 may be turned and by properly connecting the lower ends of the cables to the control elements of the engine, such as the switch, timer, clutch, or gear shift, the said parts of each motor will be simultaneously actuated for controlling the engines in the desired manner.

It is believed the details of construction and manner of use of the device will be readily understood from the foregoing without further detailed explanation.

Having thus described the invention what is claimed is:

1. A control attachment for the motors of a pair of motor driven skates comprising a belt adapted for attaching to a person, a housing attached to the belt, a pair of cables extending from the housing to each motor, gears connecting the cables for synchronous rotation and including a pinion, and manually operated means for the pinion.

2. A control attachment for the motors of a pair of motor driven skates comprising a belt adapted for attaching to a person, a housing attached to the belt, a pair of cables extending from the housing to each motor, gears connecting the cables for synchronous rotation and including a pinion, a shaft for the pinion, and a lever for operating the shaft.

3. A control attachment for the motors of a pair of motor driven skates comprising a belt adapted for attaching to a person, a housing attached to the belt, a pair of cables extending from the housing to each motor, gears connecting the cables for synchronous rotation and including a pinion, a shaft for the pinion, a lever for actuating the shaft, and coacting means between the lever and the housing for securing the lever in a predetermined position.

4. A control attachment for the motors of a pair of motor driven skates comprising a belt adapted for attaching to a person, a housing attached to the belt, a pair of cables extending from the housing to each motor, gears connecting the cables for synchronous rotation and including a pinion, a shaft for the pinion, a lever pivoted at one end to the shaft and disposed horizontally on top of the housing, teeth on the housing, a detent on the lever engaging the teeth to secure the lever in a predetermined adjusted position, and a hinged extension on the outer end of the lever.

OREN F. RUSSELL.